(12) United States Patent
Cross et al.

(10) Patent No.: US 10,743,453 B2
(45) Date of Patent: Aug. 18, 2020

(54) ROLLING BASKET INTERNAL SCRAPER

(71) Applicant: Deere & Company, Moline, IL (US)

(72) Inventors: Jacob W. Cross, Norwalk, IA (US);
Anthony Sikora, Urbandale, IA (US);
Greg T. Buse, Johnston, IA (US);
Bryan D. Blauwet, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 16 days.

(21) Appl. No.: 16/117,838

(22) Filed: Aug. 30, 2018

(65) Prior Publication Data

US 2019/0335646 A1    Nov. 7, 2019

Related U.S. Application Data

(60) Provisional application No. 62/665,189, filed on May 1, 2018.

(51) Int. Cl.
| | |
|---|---|
| *A01B 29/06* | (2006.01) |
| *A01B 29/04* | (2006.01) |
| *A01B 76/00* | (2006.01) |
| *A01B 49/02* | (2006.01) |

(52) U.S. Cl.
CPC ............ *A01B 29/06* (2013.01); *A01B 29/048* (2013.01); *A01B 49/027* (2013.01); *A01B 76/00* (2013.01)

(58) Field of Classification Search
CPC ....... A01B 29/06; A01B 29/049; A01B 76/00; A01B 49/027
See application file for complete search history.

(56) References Cited

U.S. PATENT DOCUMENTS

| | | | | | |
|---|---|---|---|---|---|
| 1,249,103 | A | * | 12/1917 | Jansky | ................. A01B 29/045 172/547 |
| 2,582,199 | A | * | 1/1952 | Gardner | ................ E01C 19/236 404/124 |
| 2,911,893 | A | * | 11/1959 | Archibald | ............... E02D 3/026 404/124 |

(Continued)

FOREIGN PATENT DOCUMENTS

| | | |
|---|---|---|
| AT | 407817 B | 6/2001 |
| DE | 7812988 U1 | 9/1978 |

(Continued)

*Primary Examiner* — Jessica H Lutz
(74) *Attorney, Agent, or Firm* — Michael Best & Friedrich LLP

(57) ABSTRACT

A basket rotates about a basket axis with respect to an implement frame when moving in a direction of travel. The basket includes first and second end plates and a plurality of blades extending therebetween. The blades engage the ground surface as the basket rotates and each include a first end and a second end positioned closer to the basket than the first end. The basket defines an internal volume between the first and second end plates and the second ends of the blades. An internal scraper is positioned within the internal volume of the basket such that a portion of the internal scraper extends rearward of a vertical plane extending through the basket axis in the direction of travel and vertically away from the ground surface above a horizontal second plane extending through the basket axis. The internal scraper extends at an acute angle with respect to horizontal.

20 Claims, 14 Drawing Sheets

(56) References Cited

U.S. PATENT DOCUMENTS

| | | | | |
|---|---|---|---|---|
| 3,392,791 | A | * | 7/1968 | Orthman ................ A01B 29/04 172/105 |
| 4,145,823 | A | * | 3/1979 | Lucas ...................... E01H 5/04 172/547 |
| 4,919,211 | A | * | 4/1990 | Cope ...................... A01B 27/00 172/520 |
| 9,462,737 | B2 | | 10/2016 | Westlind |
| 10,375,872 | B2 | * | 8/2019 | Huitt .................... A01B 29/048 |
| 2013/0062084 | A1 | | 3/2013 | Casper et al. |
| 2014/0209337 | A1 | * | 7/2014 | Westlind .............. A01B 33/142 172/552 |
| 2016/0088787 | A1 | | 3/2016 | Connell et al. |
| 2017/0079192 | A1 | | 3/2017 | Steinlage et al. |

FOREIGN PATENT DOCUMENTS

| | | |
|---|---|---|
| EP | 1639876 B1 | 6/2008 |
| FR | 2586887 A1 | 3/1987 |

\* cited by examiner

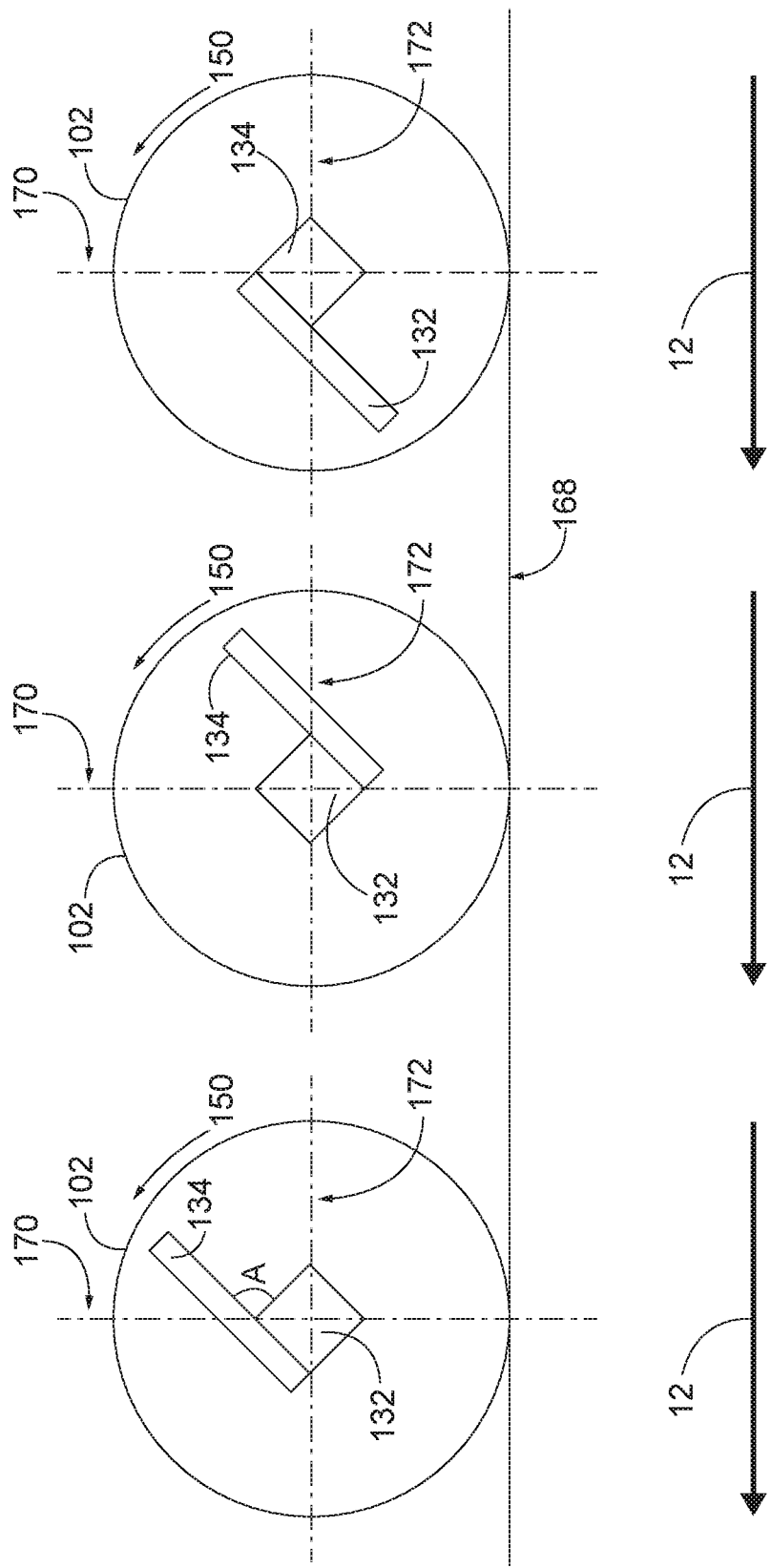

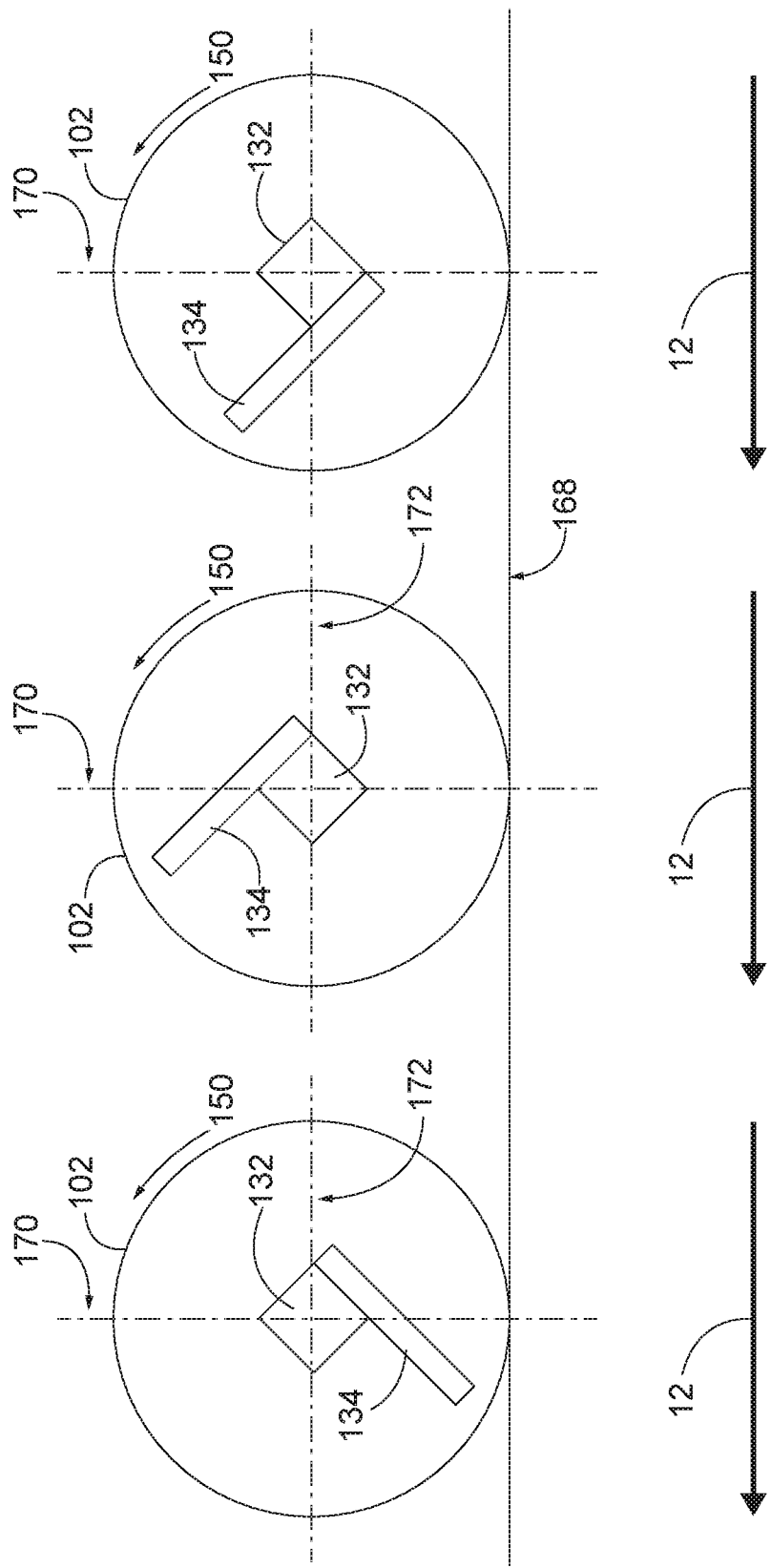

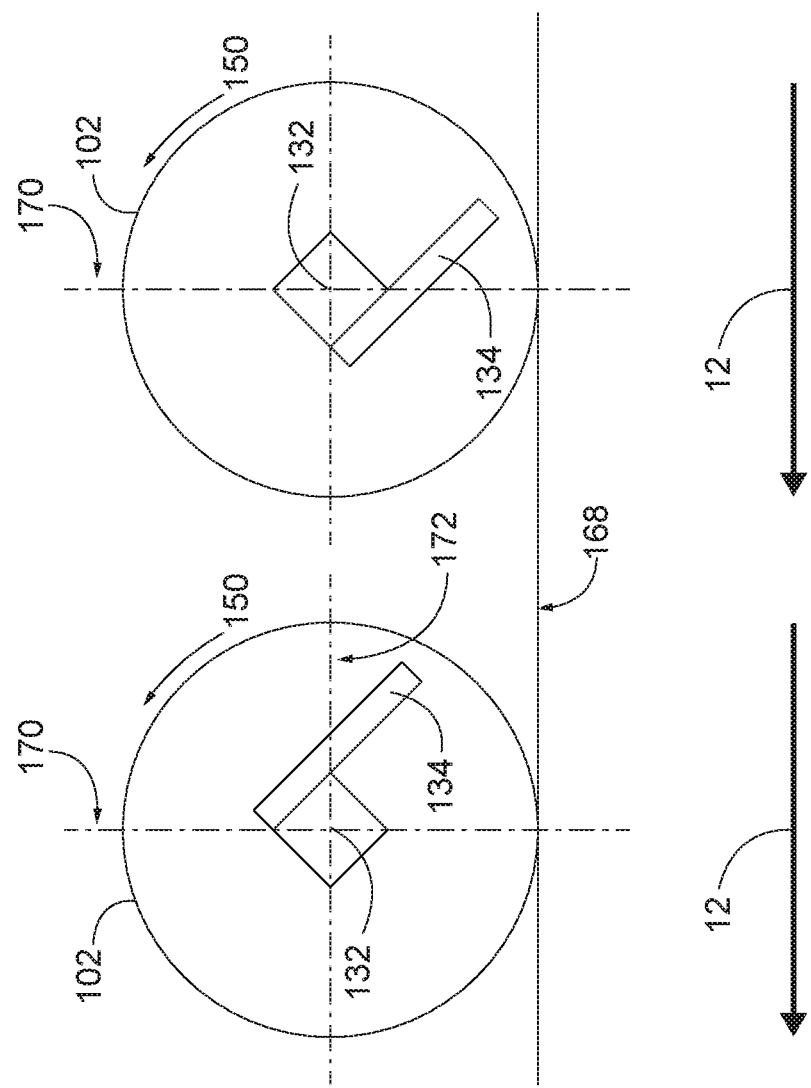

ROLLING BASKET INTERNAL SCRAPER

BACKGROUND

The present disclosure relates to rolling baskets moved by a work vehicle.

SUMMARY

In one embodiment, the disclosure provides an implement configured to be connected to a vehicle for movement along a ground surface in a direction of travel. The implement includes an implement frame that can be coupled to the vehicle for movement along the ground in the direction of travel. A ground-engaging tool assembly is connected to the implement frame, and can engage the ground surface as the implement moves in the direction of travel. A basket is connected to the implement frame and can rotate with respect to the implement frame about a basket axis. The basket includes a first end plate, a second end plate and a plurality of blades extending between the first and second end plates. The plurality of blades can engage the ground surface as the basket rotates. The plurality of blades each include a first end and a second end. The first ends are each positioned to engage the ground surface and the second ends are each positioned closer to the basket axis than the respective first end. The basket defines an internal volume between the first end plate, the second end plate and each second end of the plurality of blades. The internal volume is separated into portions by a first plane extending along the basket axis perpendicular to the ground and a second plane extending along the basket axis parallel to the ground. An internal scraper is positioned within the internal volume of the basket such that a portion of the internal scraper extends rearward of the first plane in the direction of travel and vertically away from the ground surface above the second plane. The portion of the internal scraper is oriented at an acute angle with respect to the second plane. The internal scraper is configured to inhibit soil accumulation within the internal volume of the basket during basket rotation.

In another embodiment, the disclosure provides an implement that can be connected to a vehicle for movement along a ground surface in a direction of travel. The implement includes an implement frame that can be connected to the vehicle for movement along the ground in the direction of travel. A ground-engaging tool assembly is connected to the implement frame and can engage the ground surface as the implement frame moves in the direction of travel. A basket is connected to the implement frame for rotation with respect to the implement frame about a basket axis. The basket includes a first end plate, a second end plate and a plurality of blades extending between the first and second end plates. The plurality of blades engage the ground surface as the basket rotates. The plurality of blades each include a first end and a second end. The first ends are each positioned to engage the ground surface and the second ends are each positioned closer to the basket axis than the respective first end. The basket defines an internal volume between the first end plate, the second end plate and each second end of the plurality of blades. The internal volume is separated into portions by a first plane extending along the basket axis perpendicular to the ground surface and a second plane extending along the basket axis parallel to the ground surface. An internal scraper is positioned within the internal volume of the basket. A portion of the internal scraper extends forward of the first plane in the direction of travel and vertically toward the ground surface below the second plane, and the portion of the internal scraper is oriented at an acute angle with respect to the second plane. The internal scraper is configured to inhibit soil accumulation within the internal volume of the basket during rotation of the basket.

In another embodiment, the disclosure provides an implement that can be coupled to a vehicle for movement along a ground surface in a direction of travel. The implement includes an implement frame that can be connected to the vehicle for movement along the ground in the direction of travel, a ground-engaging tool assembly connected to the implement frame. The ground-engaging tool assembly can engage the ground surface as the implement frame moves in the direction of travel. A basket is connected to the implement frame for rotation with respect to the implement frame about a basket axis. The basket includes a first end plate, a second end plate and a plurality of blades extending between the first and second end plates. The plurality of blades can engage the ground surface as the basket rotates. The blades each include a first end and a second end. The first ends are all each to engage the ground surface and the second ends are each positioned closer to the basket axis than the respective first end. The basket defines an internal volume between the first end plate, the second end plate and each second end of the plurality of blades. The internal volume is separated into portions by a first plane extending along the basket axis perpendicular to the ground surface and a second plane extending the basket axis parallel to the ground surface. An internal scraper is positioned within the internal volume of the basket, and the internal scraper extends at a first acute angle with respect to the first plane and a second acute angle with respect to the second plan. A first portion of the internal scraper is positioned forward of the first plane in the direction of travel and a second portion of the internal scraper is positioned rearward of the first plane in the direction of travel. The first portion of the internal scraper is positioned at a first height with respect to the ground surface, and the second portion of the internal scraper is positioned at a second height with respect to the ground surface, in which the second height is greater than the first height. The internal scraper can inhibit soil accumulation within the internal volume of the basket.

Other aspects of the disclosure will become apparent by consideration of the detailed description and accompanying drawings.

BRIEF DESCRIPTION OF THE DRAWINGS

FIGS. 8-15 show alternative mounting configurations for a scraper on the rolling basket.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

The term "rolling basket" generally refers to a "basket roller" as used by American Society of Agricultural Engineers (ASAE) Standard Terminology and Definitions for Agricultural Tillage Implements. A rolling basket is assembled and connected to be a part of an agricultural tillage implement. The agricultural tillage implement can have one or more rolling baskets assembled thereto.

It has been discovered that conventional baskets are prone to plugging in muddy or moist conditions. The present disclosure solves the plugging problem with a scraper positioned within the basket. The scraper disrupts the flow of mud inside the inner volume of the basket. That is, the scraper inhibits the mud from pushing into the center of the inner volume of the basket which otherwise tends to fill up the basket.

Figure 1:
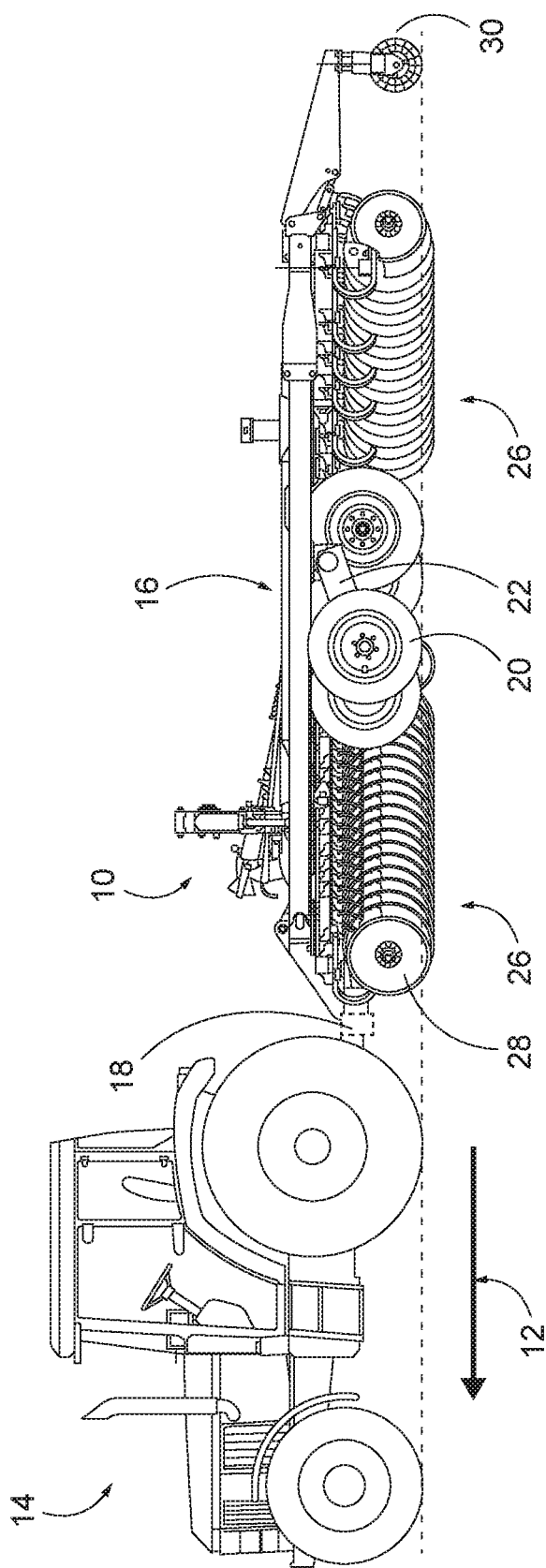
FIG. 1 is a side view of an embodiment of an agricultural tillage implement.

FIG. 1 is a perspective view of agricultural implement 10. Alternative embodiments may involve different agricultural implements, including those with rolling baskets, disks, wheels, or drums, to name but a few possibilities. Implement 10 may be towed through a field, such as by an agricultural vehicle, in travel direction 12.

The illustrated implement 10 is coupled to an agricultural vehicle 14 so that it may be towed through a field under the power of the agricultural vehicle. In alternative embodiments, implement 10 may be partially or totally self-driven, such as by generating its own power or receiving power from an agricultural vehicle (e.g., transmitted mechanically, hydraulically, or electrically) and transmitting that power to one or more wheels or tracks of implement 10 (e.g., via a motor or transmission).

The illustrated agricultural implement includes a frame 16 is affixed to hitch 18 and extends rearwardly from hitch 18 in a direction opposite the direction of travel 12. The illustrated frame 16 includes multiple interconnected rigid members, some of which are affixed to each other (e.g., via welds) while others are movably connected to each other (e.g., pivotally connected, slidably connected). The frame 16 may be foldable, such that it can be collapsed into a more compact configuration for transport or storage, then expanded prior to being towed through a field. Deploying mechanisms, such as double-acting hydraulic cylinders, may be used to collapse and expand the frame 16. Alternatively, deploying mechanisms may be electric, pneumatic, or mechanical actuators, and may be powered by an agricultural vehicle or manual operation. The frame 16 provides strength and rigidity to implement 10, as well as attachment points for other components, including wheels 20, an adjustment device 22, and ground-engaging tools.

Wheels 20 may be pivotally connected to frame 16 via the adjustment device 22. Wheels 20 provide rolling support to implement 10 on the ground at a height and/or downward force which may be adjusted through adjustment device 22.

Disk gangs 26 are pivotally connected to frame 16 so as to allow disk gangs 26 to roll along the ground when the implement 10 is towed in the travel direction 12. Disk gangs 26 are ground-engaging tool assemblies, each of which includes a plurality of disks 28. The disks 28 may engage the ground to work a field or area to break up chunks of soil or debris and smooth the surface of the field. In alternative configurations, the disks 28 may be used to create furrows in a field. The disks 28 may exert a force on the ground, the magnitude of which may be adjusted such as through the pressurization and actuation of the adjustment device 22 by one or more valves.

The illustrated implement 10 includes a plurality of rolling baskets 30 which are pivotally connected to frame 16 so as to allow them to roll along the ground while implement 10 is towed in travel direction 12. Rolling baskets 30 are ground-engaging tools which may break up chunks of soil or debris and smooth the surface of the field. Rolling baskets 30 may exert a force on the ground, the magnitude of which may be adjusted such as through the pressurization and actuation of adjustment device 22 by one or more valves.

Figure 2:
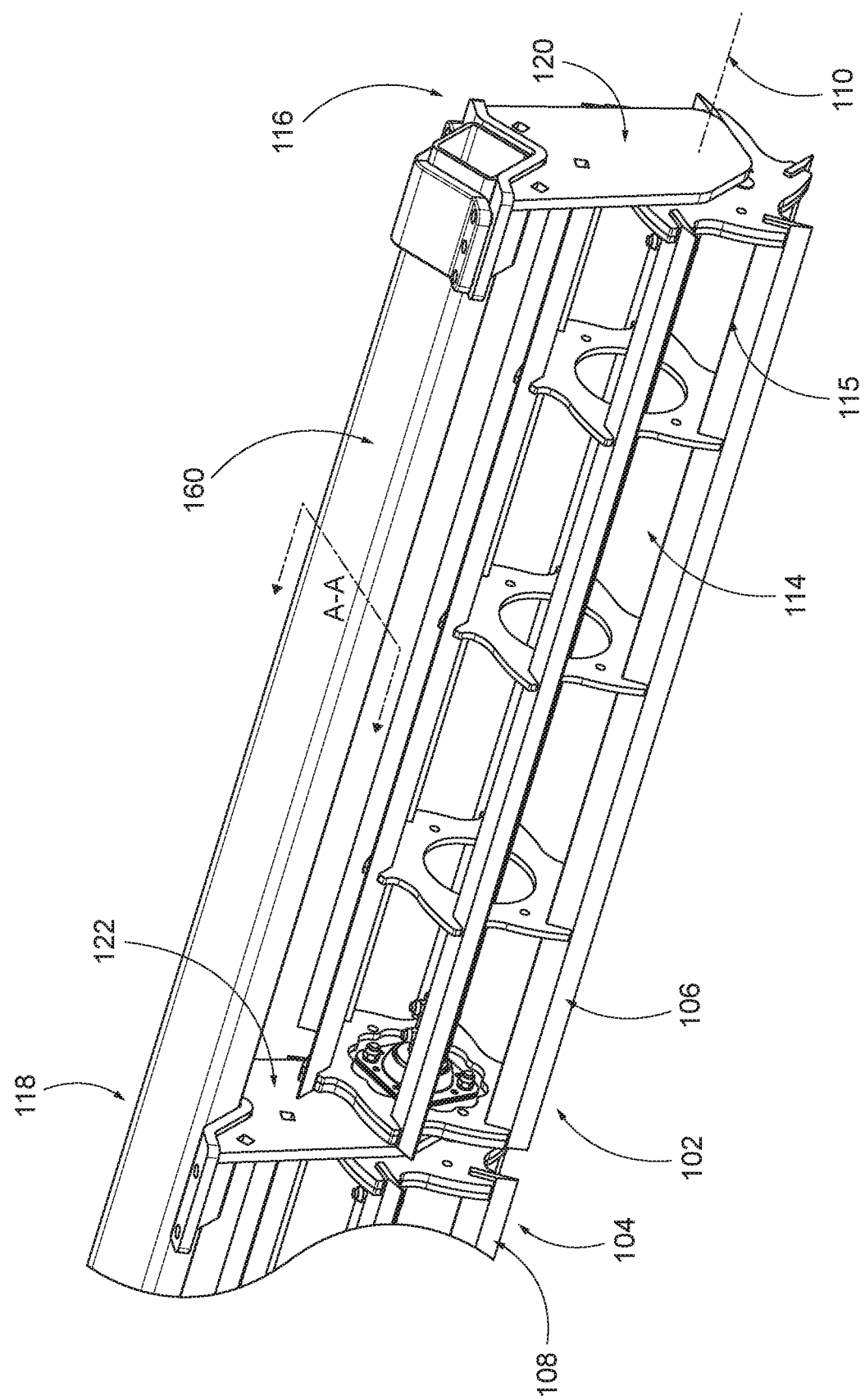
FIG. 2 is a perspective view of a rolling basket of the agricultural tillage implement of FIG. 1.

FIG. 2 shows an embodiment including rolling baskets 102, 104 for an agricultural tillage implement (10 shown in FIG. 1). Each of the rolling baskets 102, 104 has a generally cylindrical shape formed by a plurality of blades 106, 108. In other embodiments, one or more of the blades 106, 108 can be replaced with wire rods or bars. Rolling basket 102 will be discussed in detail, but rolling basket 104 can be identical or substantially identical to rolling basket 102. The plurality of blades 106 of the rolling basket 102 extend from near one end parallel to a central axis 110 of the rolling basket 102 and extend toward an opposing end. The illustrated rolling basket assembly 100 has the two rolling baskets 102, 104 aligned so that both of the rolling baskets 102, 104 extend along the central axis 110.

The illustrated rolling basket 102 has the plurality blades 106 disposed generally evenly spaced around a circumference defined by a fixed radius away from the central axis 110 thereby forming a "basket" structure. The basket structure defines an inner chamber 114 of the rolling basket 102. The basket structure has a plurality of openings 115 connecting the inner chamber 114 to the outside of the basket structure.

The plurality of blades 106 can be straight or curved (e.g. helical) as they extend axially from a first end 116 of the rolling basket 102 to a second end 118. When in use, the rolling basket 102 is positioned on the ground so that its central axis 110 is substantially parallel with a surface of the ground, and the plurality of blades 106 rotate around the central axis 110 to work the soil.

Figure 3:
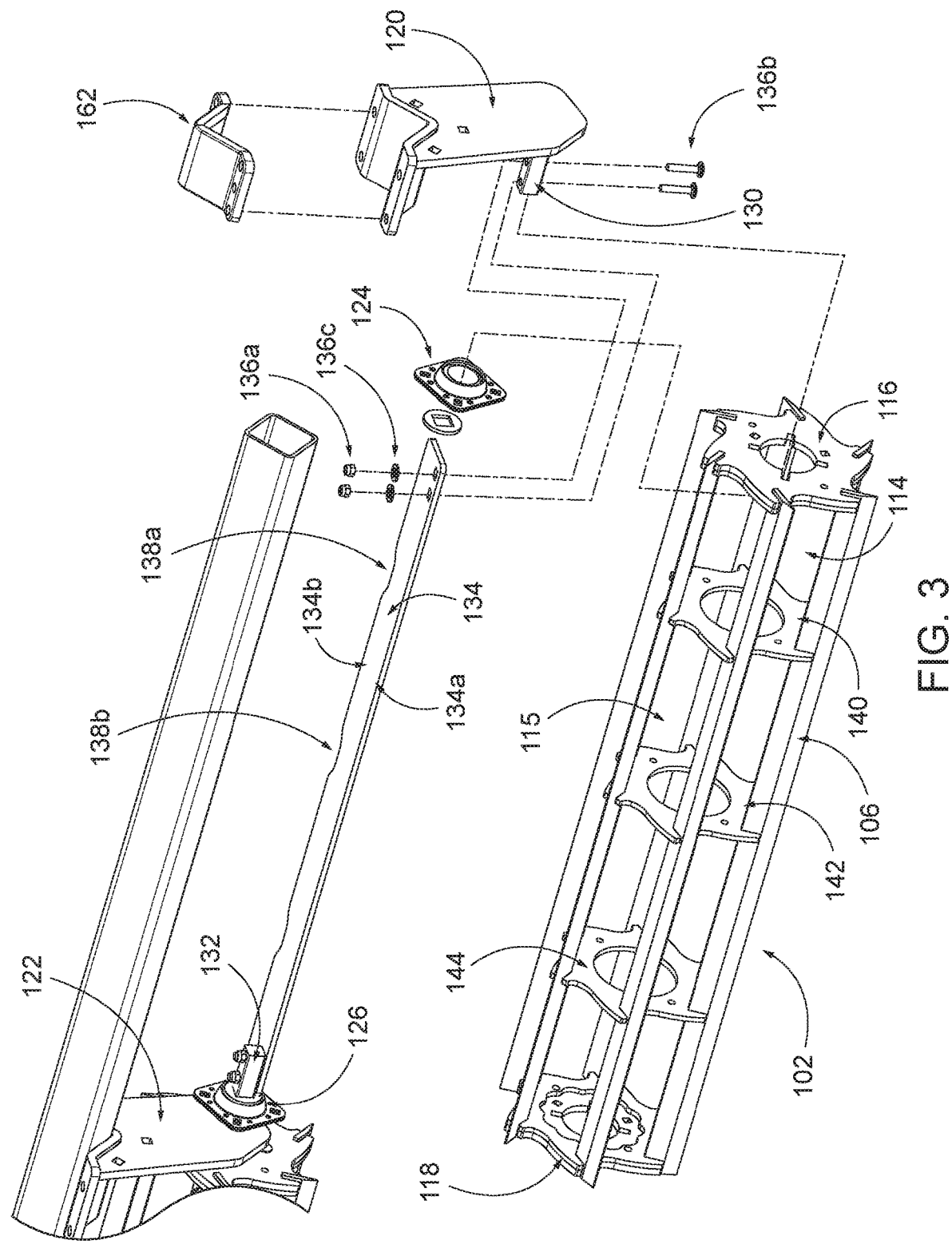
FIG. 3 is an exploded view of the rolling basket of FIG. 2.

With reference to FIG. 3, the illustrated rolling basket 102 is connected to two support arms 120, 122 via bearings 124, 126. The bearings 124, 126 are connected to the rolling basket 102 at ends 116, 118 of the rolling basket. The bearings 124, 126 are configured to allow the rolling basket 102 to rotate around its central axis 110 as the rolling basket 102 is pulled by the agricultural vehicle 14.

The support arm 120 includes a post 130 configured to support the bearing 124 and the support arm 122 includes a post 132 configured to support the bearing 126. The bearings 124, 126 permit the rolling basket 102 to rotate about the posts 130, 132. An internal scraper 134 is coupled to the posts 130, 132 with a plurality of fasteners 136. The illustrated fasteners 136 include nuts 136a, bolts 136b and washers 136c, but other suitable fasteners can be utilized. The illustrated internal scraper 134 extends between the first end 116 and the second end 118 of the rolling basket 102. The internal scraper 134 is positioned in the inner chamber 114 of the rolling basket 102.

Figure 4:
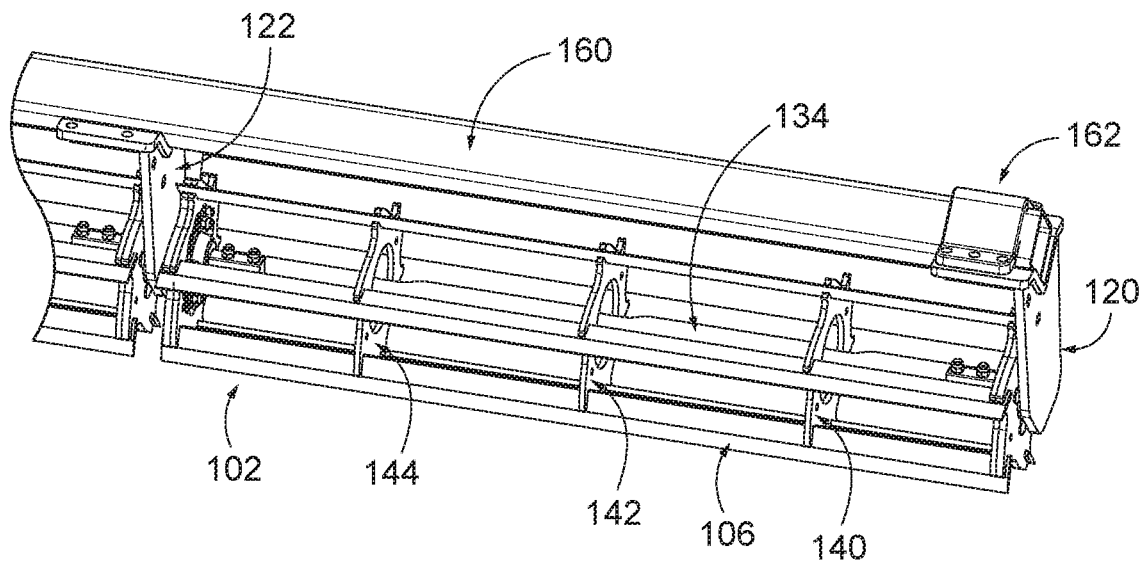
FIG. 4 is a perspective view of the rolling basket of FIG. 2.
Figure 5:
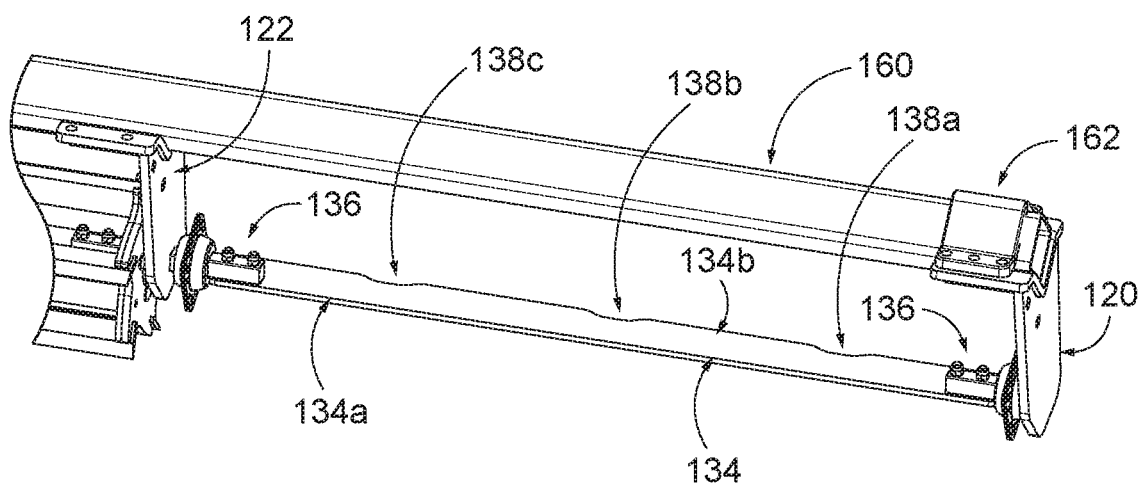
FIG. 5 is a partial perspective view of the rolling basket of FIG. 2.

As shown in FIGS. 3-5, the illustrated internal scraper 134 includes an elongated blade 134a that is coupled to the posts 130, 132 and a flange 134b that extends to one side of the posts 130, 132. The flange includes a plurality of notches 138a, 138b and 138c to accommodate support plates 140, 142 and 144 inside the inner chamber 114 of the rolling basket 102. The elongated blade 134a of the internal scraper 134 is fixed to the posts 130, 132 of the support arms 120, 122 such that the rolling basket 102 rotates about the internal scraper 134. The internal scraper 134 inhibits large clods of debris (such as dirt and mud) from accumulating within the inner chamber 114 of the rolling basket 102. Specifically, as the rolling basket 102 rotates about the internal scraper 134, the internal scraper 134 breaks up and/or expels debris from within the inner chamber 114 of the rolling basket 102. In some embodiments, the flange 134b is oriented at an obtuse angle with respect to the elongated blade 134a.

Figure 6:
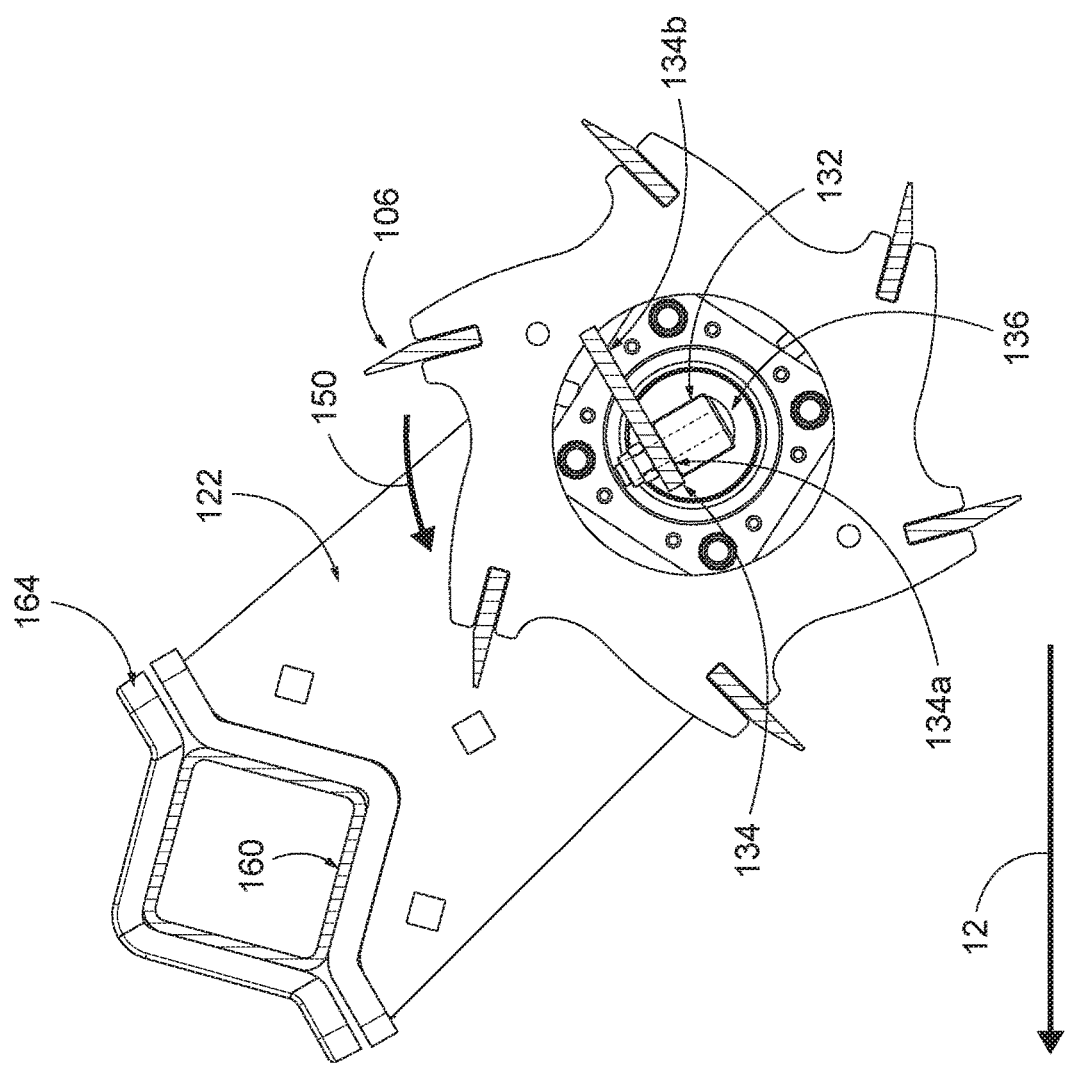
FIG. 6 is a cross-sectional view taken along line A-A of FIG. 2 according to some embodiments.

The embodiment of FIG. 6 illustrates a mounting location of the internal scraper 134 above the axis of rotation of the rolling basket 102 (see central axis 110 in FIG. 2). Specifically, the elongated blade 134a of the internal scraper 134 is mounted to an upper side of the posts 130, 132 and the flange 134b of the internal scraper 134 extends rearward relative to the elongated blade 134a in the direction of travel 12. The fasteners 136 extend through the elongated blade 134a and the illustrated flange 134b extends rearward of the fasteners 136 relative to the direction of travel 12. As the rolling basket 102 rotates in the direction of arrow 150, any debris trapped in the inner chamber 114 abuts the internal scraper 134. The flange 134b of the internal scraper 134 urges debris against the blades 106 to break up debris and to direct debris out of the inner chamber 114 of the rolling basket 102.

Figure 7:
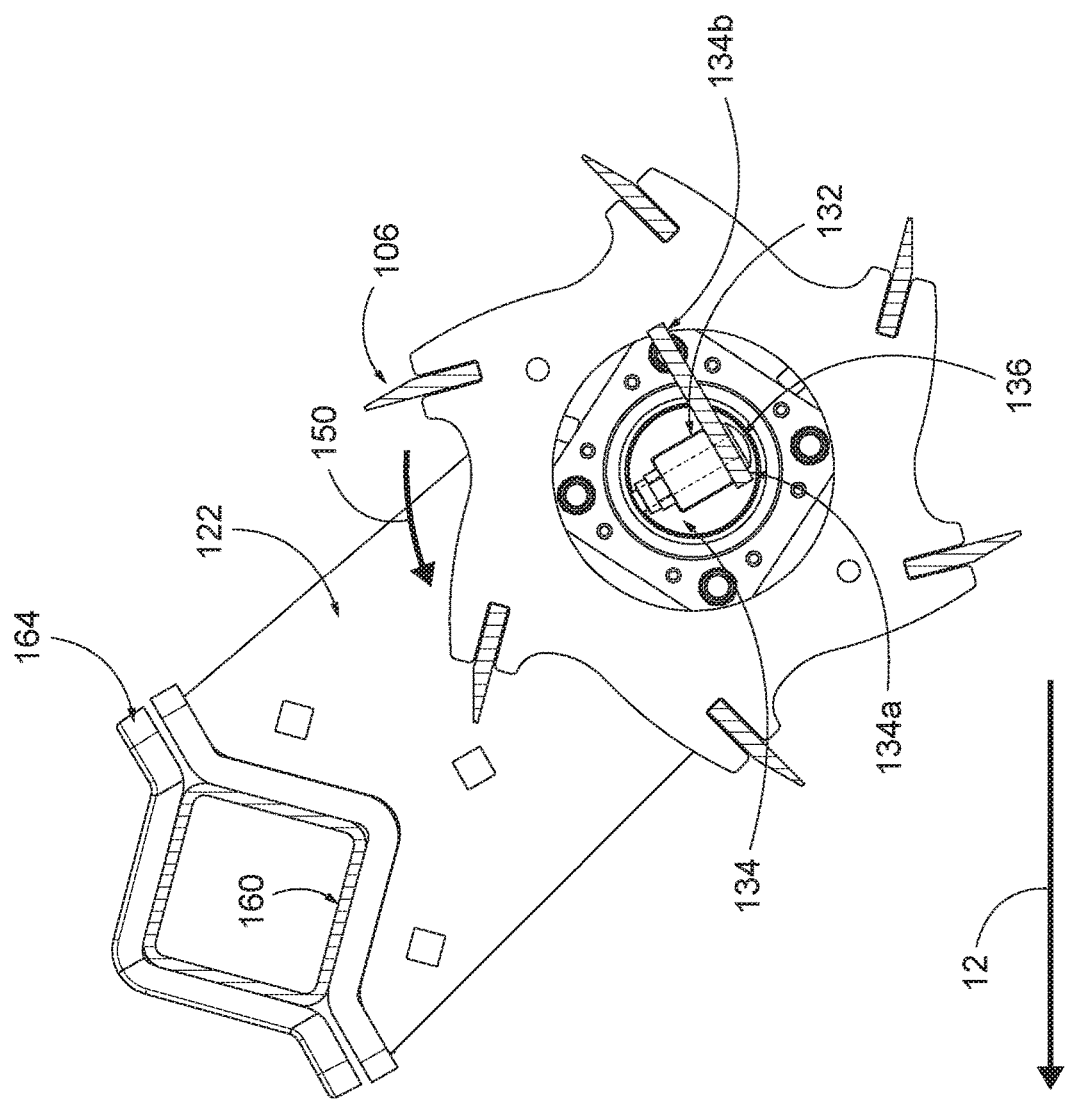
FIG. 7 is a cross-sectional view taken along line A-A of FIG. 2 according to some embodiments.

The embodiment of FIG. 7 illustrates a mounting location of the internal scraper 134 below the axis of rotation of the rolling basket 102 (see central axis 110 in FIG. 2). Specifically, the elongated blade 134a of the internal scraper 134 is mounted to a lower side of the posts 130, 132 and the flange 134b of the internal scraper 134 extends rearward relative to the elongated blade 134a in the direction of travel 12. The fasteners 136 extend through the elongated blade 134a and the illustrated flange 134b extends rearward of the fasteners 136 relative to the direction of travel 12. As the rolling basket 102 rotates in the direction of arrow 150, any debris trapped in the inner chamber 114 abuts the internal scraper 134. The flange 134b of the internal scraper 134 urges debris against the blades 106 to break up debris and to direct debris out of the inner chamber 114 of the rolling basket 102.

The illustrated support arm 120 is coupled to a frame member 160 with a top bracket 162 that engage the support arm 120 (see FIG. 5). The support arm 122 is also coupled to the frame member with a top bracket 164 (see FIGS. 6-7). The angle of the frame member 160 with respect to the tractor can be changed to adjust a pressure exerted on the ground by the rolling basket 102.

In both FIGS. 6 and 7, a portion of the internal scraper 134 extends behind the central axis 110 of the basket 102 with respect to the direction of travel 12. FIGS. 6 and 7 show internal scrapers 134 that are mounted to the posts 130, 132 at an angle that is not parallel to or perpendicular to the ground surface. Specifically, the internal scrapers 134 are all mounted to the posts 130, 132 at an acute angle with respect to the ground surface. Because the angle between the internal scrapers 134 and the ground surface is not parallel or perpendicular, any soil that has accrued in the internal volume of the basket 102 is pushed out of the internal volume by the internal scraper 134. If the internal scraper 134 were positioned parallel or perpendicular to the ground surface, any dirt would abut against the internal scraper 134 and would increase the resistance to rotation of the basket 102. The angle of the internal scraper 134 increases the likelihood that any dirt or debris is pushed out of the basket 102.

FIGS. 8-11 are schematic views that illustrate a plurality of possible locations for mounting the internal scraper 134 onto the posts 130, 132 of the first basket 102. The scraper 134 is shown as a rectangle and can be mounted to the post 132 which is shown as a square. The post 132 essentially defines the central axis 110 about which the first basket 102 rotates. The schematic internal scraper 134 is shown as a planar element, but can orient the flange 134b at an obtuse angle with respect to the blade portion 134a in other embodiments. In the illustrated embodiment, the entire internal scraper 134 extends at a right angle with respect to the post 132 (see angle A in FIG. 8). In some embodiments, the scraper 134 extends at an obtuse angle with respect to the post 132 (i.e., angle A is greater than ninety degrees). In other embodiments, the scraper 134 extends at an acute angle with respect to the post 132 (i.e., angle A is less than ninety degrees).

FIGS. 8-11 all show internal scrapers 134 that are mounted to the posts 130, 132 at an angle that is not parallel to or perpendicular to a ground surface 168. Specifically, the internal scrapers 134 are all mounted to the posts 130, 132 at an acute angle with respect to the ground surface 168. Because the angle between the internal scrapers 134 and the ground surface is not parallel or perpendicular, any soil that has accrued in the internal volume of the basket 102 is pushed out of the internal volume by the internal scraper 134. If the internal scraper 134 were positioned perpendicular to the ground surface 168, any dirt would abut against the internal scraper 134 and would increase the resistance to rotation of the basket 102. The angle of the internal scraper 134 increases the likelihood that any dirt or debris is pushed out of the basket 102.

FIG. 8 corresponds to the mounting location shown in FIG. 6 in which the internal scraper 134 is mounted to a top of the post 132 and extends upward and to the right (which is away from the direction of travel 12). Specifically, FIG. 8 includes a first vertical plane 170 and a second horizontal plane 172 that extend through the central axis 110 about which the first basket 102 rotates. A portion of the scraper 134 extends laterally behind the first vertical plane 170 with respect to the direction of travel 12. This same portion of the scraper 134 also extends vertically above the second horizontal plane 172 such that the portion of the scraper 134 is positioned further from the ground surface 168 than the second horizontal plane 172.

FIG. 9 corresponds to the mounting location shown in FIG. 7 in which the internal scraper 134 is mounted to a bottom of the post 132 and extends upward and to the right (which is away from the direction of travel 12). Specifically, FIG. 9 includes the first vertical plane 170 and the second horizontal plane 172 that extend through the central axis 110 about which the first basket 102 rotates. A portion of the scraper 134 extends laterally behind the first vertical plane 170 with respect to the direction of travel 12. This same portion of the scraper 134 also extends vertically above the second horizontal plane 172 such that the portion of the scraper 134 is positioned further from the ground surface 168 than the second horizontal plane 172.

The orientation of the scraper 134 in FIGS. 8 and 9 being above and behind the central axis 110 provides the benefit that any trapped soil is pushed out of the basket 102 behind the basket. The diagonal orientation of the scraper 134 in FIGS. 8 and 9 gradually pushes trapped soil out of the basket 102 without creating a hard stop such as would be provided by a horizontal or vertical orientation because the trapped soil is pushed outward gradually as a radial distance between the edge of the scraper 134 and the perimeter of the basket 102 decreases. The rotation of the basket in the direction of arrow 150 is utilized to urge the trapped soil against the diagonal scraper 134 to thereby push the trapped soil out of the basket 102 behind the basket 102 in the direction of travel 12.

FIG. 10 illustrates a mounting configuration in which the internal scraper 134 is mounted to a top of the post 132 and extends downward and toward the direction of travel 12. A portion of the internal scraper 134 is positioned below the axis of rotation of the basket 102. Specifically, FIG. 10 includes the first vertical plane 170 and the second horizontal plane 172 that extend through the central axis 110 about which the first basket 102 rotates. A portion of the scraper 134 extends laterally in front of the first vertical plane 170 with respect to the direction of travel 12. This same portion of the scraper 134 also extends vertically below the second horizontal plane 172 such that the portion of the scraper 134 is positioned closer to the ground surface 168 than the second horizontal plane 172.

FIG. 11 illustrates a mounting configuration in which the internal scraper 134 is mounted to a bottom of the post 132 and extends downward and toward the direction of travel 12. A portion of the internal scraper 134 is positioned below the axis of rotation of the basket 102. Specifically, FIG. 11 includes the first vertical plane 170 and the second horizontal plane 172 that extend through the central axis 110 about which the first basket 102 rotates. A portion of the scraper 134 extends laterally in front of the first vertical plane 170 with respect to the direction of travel 12. This same portion of the scraper 134 also extends vertically below the second horizontal plane 172 such that the portion of the scraper 134 is positioned closer to the ground surface 168 than the second horizontal plane 172.

The diagonal orientation of the scraper 134 in FIGS. 10 and 11 gradually pushes trapped soil out of the basket 102 without creating a hard stop such as would be provided by a horizontal or vertical orientation because the trapped soil is pushed outward gradually as a radial distance between the edge of the scraper 134 and the perimeter of the basket 102 decreases. The rotation of the basket in the direction of arrow 150 is utilized to urge the trapped soil against the diagonal scraper 134 to thereby push the trapped soil out of the basket 102.

FIG. 12 illustrates a mounting configuration in which the internal scraper 134 is mounted to a top of the post 132 and extends upward and toward the direction of travel 12. Specifically, FIG. 12 includes the first vertical plane 170 and the second horizontal plane 172 that extend through the central axis 110 about which the first basket 102 rotates. A portion of the scraper 134 extends laterally in front of the first vertical plane 170 with respect to the direction of travel 12. This same portion of the scraper 134 also extends vertically above the second horizontal plane 172 such that the portion of the scraper 134 is positioned further from the ground surface 168 than the second horizontal plane 172.

FIG. 13 illustrates a mounting configuration in which the internal scraper 134 is mounted to a bottom of the post 132 and extends upward and toward the direction of travel 12. Specifically, FIG. 13 includes the first vertical plane 170 and the second horizontal plane 172 that extend through the central axis 110 about which the first basket 102 rotates. A portion of the scraper 134 extends laterally in front of the first vertical plane 170 with respect to the direction of travel 12. This same portion of the scraper 134 also extends vertically above the second horizontal plane 172 such that the portion of the scraper 134 is positioned further from the ground surface 168 than the second horizontal plane 172.

FIG. 14 illustrates a mounting configuration in which the internal scraper 134 is mounted to a top of the post 132 and extends downward and away from the direction of travel 12. Specifically, FIG. 14 includes the first vertical plane 170 and the second horizontal plane 172 that extend through the central axis 110 about which the first basket 102 rotates. A portion of the scraper 134 extends laterally behind the first vertical plane 170 with respect to the direction of travel 12. This same portion of the scraper 134 also extends vertically below the second horizontal plane 172 such that the portion of the scraper 134 is positioned closer to the ground surface 168 than the second horizontal plane 172.

FIG. 15 illustrates a mounting configuration in which the internal scraper 134 is mounted to a bottom of the post 132 and extends downward and away from the direction of travel 12. A portion of the internal scraper 134 is positioned below the axis of rotation of the basket 102. Specifically, FIG. 15 includes the first vertical plane 170 and the second horizontal plane 172 that extend through the central axis 110 about which the first basket 102 rotates. A portion of the scraper 134 extends laterally behind the first vertical plane 170 with respect to the direction of travel 12. This same portion of the scraper 134 also extends vertically below the second horizontal plane 172 such that the portion of the scraper 134 is positioned closer to the ground surface 168 than the second horizontal plane 172.

FIGS. 16-20 illustrate a different embodiment of a rolling basket 202 for an agricultural tillage implement (10 shown in FIG. 1). The illustrated rolling basket 202 has a generally cylindrical shape formed by a plurality of blades 206. In other embodiments, one or more of the blades 206 can be replaced with wire rods or bars. Rolling basket 202 is similar to rolling basket 102 and only the differences will be discussed in detail. The plurality of blades 206 of the rolling basket 202 extend from near one end parallel to a central axis 210 of the rolling basket 202 and extend toward an opposing end.

The illustrated rolling basket 202 has the plurality blades 206 disposed generally evenly spaced around a circumference defined by a fixed radius away from the central axis 210 thereby forming a "basket" structure. The basket structure defines an inner chamber 214 of the rolling basket 202. The basket structure has a plurality of openings 215 connecting the inner chamber 214 to the outside of the basket structure.

Figure 16:
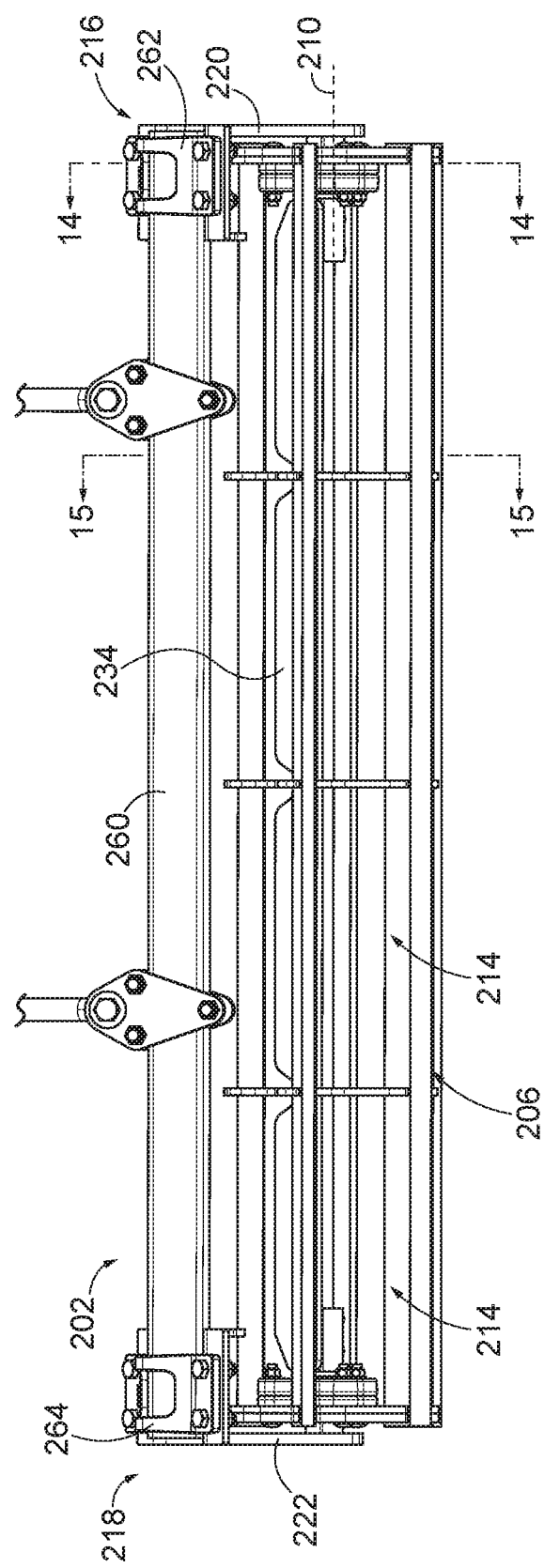
FIG. 16 is a front view of another embodiment of a rolling basket.
Figure 17:
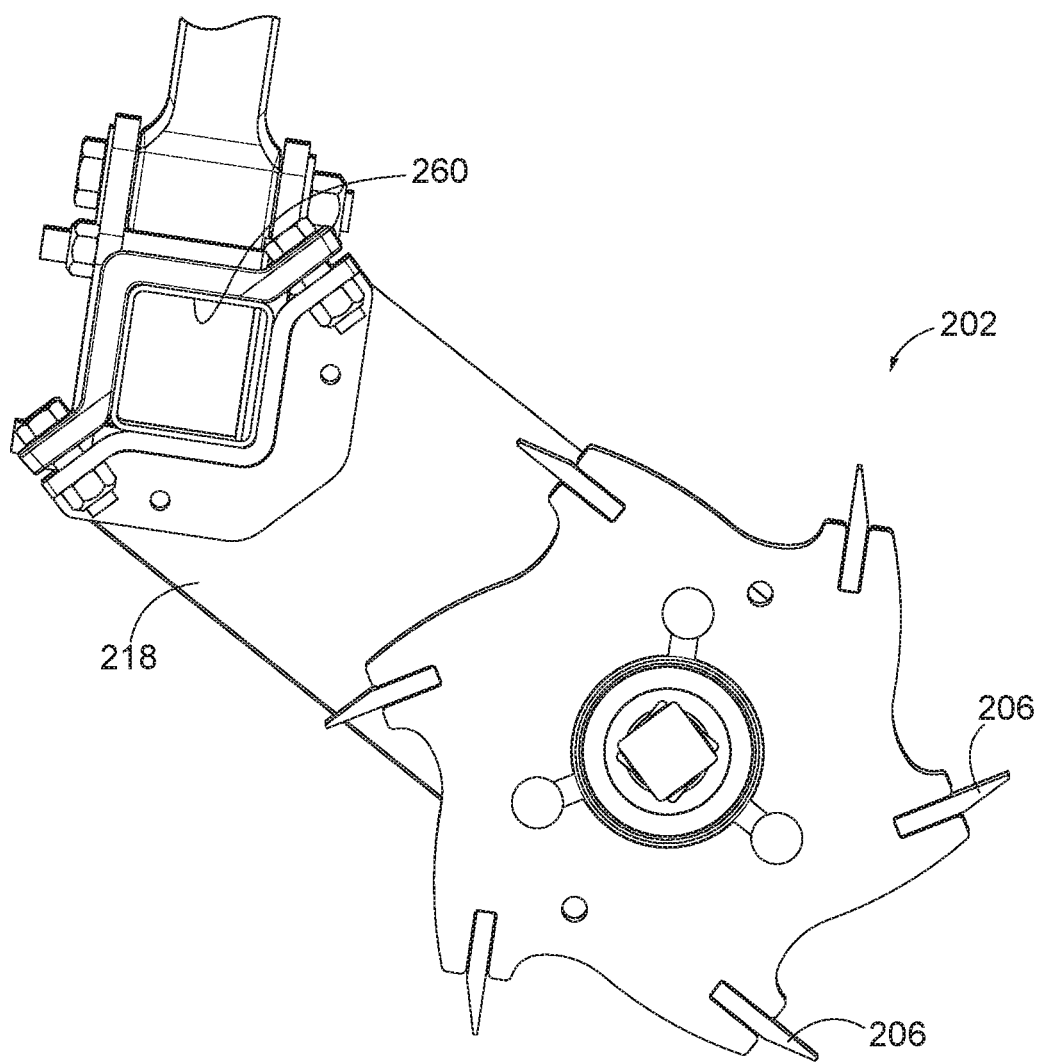
FIG. 17 is a side view of the rolling basket of FIG. 16.
Figure 18:
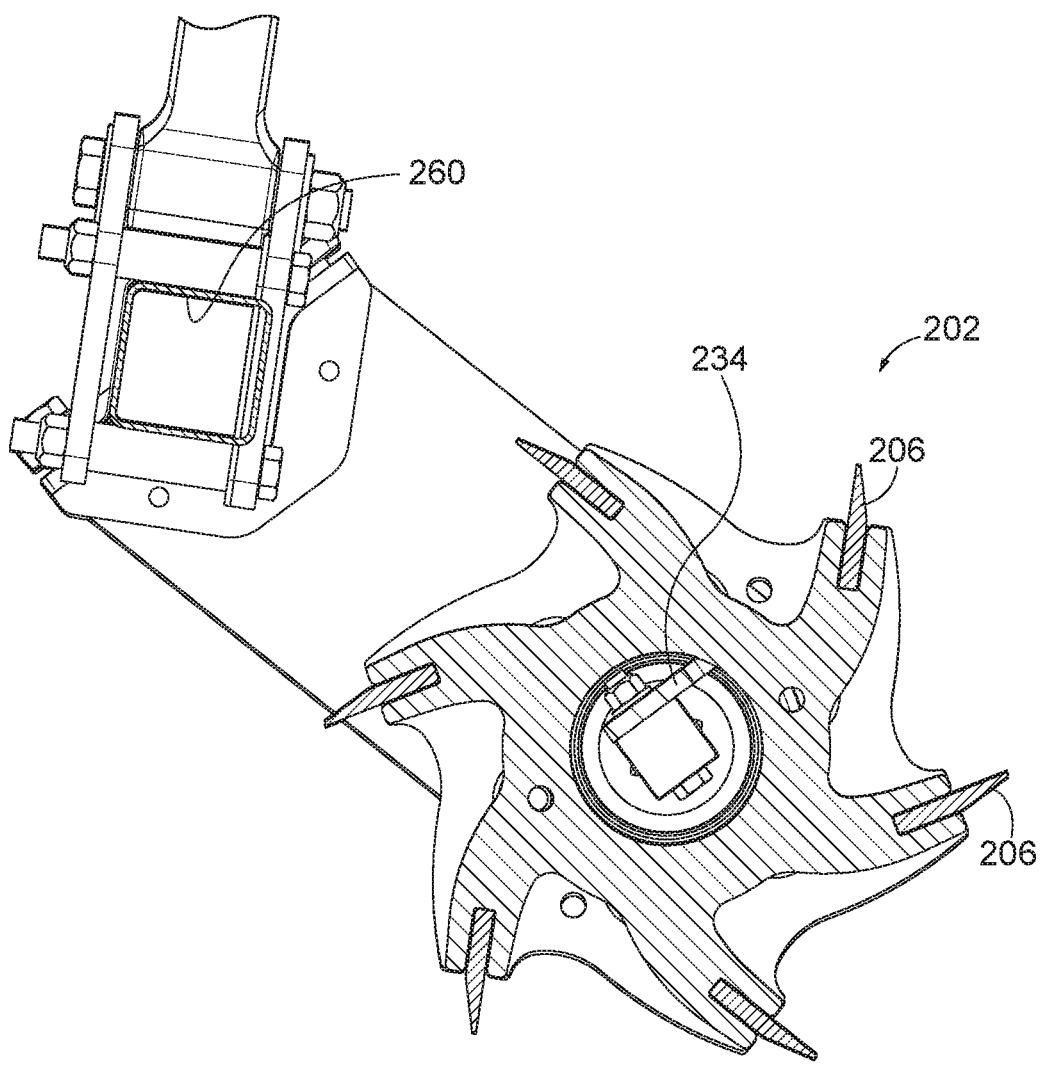
FIG. 18 is a cross-sectional view of the rolling basket taken along line 14-14 of FIG. 16.
Figure 20:
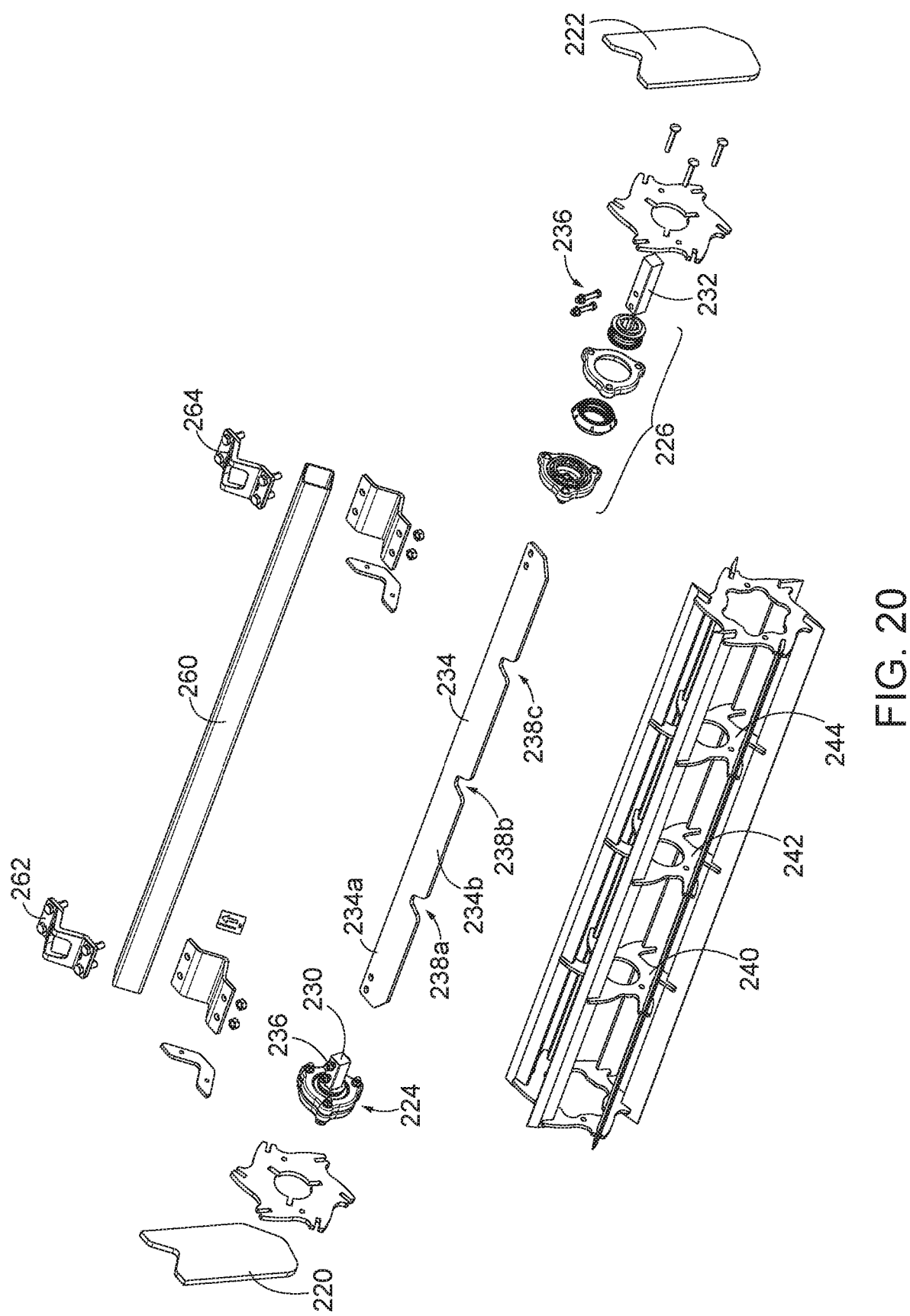
FIG. 20 is an exploded view of the rolling basket of FIGS. 16-19.

With reference to FIGS. 16 and 20, the illustrated rolling basket 202 is connected to two support arms 220, 222 via bearings 224, 226. The bearings 224, 226 are connected to the rolling basket 202 at ends 216, 218 of the rolling basket. The bearings 224, 226 are configured to allow the rolling basket 202 to rotate around its central axis 210 as the rolling basket 202 is pulled by the agricultural vehicle 14.

The support arm 220 includes a post 230 configured to support the bearing 224 and the support arm 222 includes a post 232 configured to support the bearing 226. The bearings 224, 226 permit the rolling basket 202 to rotate about the posts 230, 232. An internal scraper 234 is coupled to the posts 230, 232 with a plurality of fasteners 236. The illustrated fasteners 236 include nuts, bolts and washers, but other suitable fasteners can be utilized. The illustrated internal scraper 234 extends between the first end 216 and the second end 218 of the rolling basket 202. The internal scraper 234 is positioned in the inner chamber 214 of the rolling basket 202.

Figure 19:
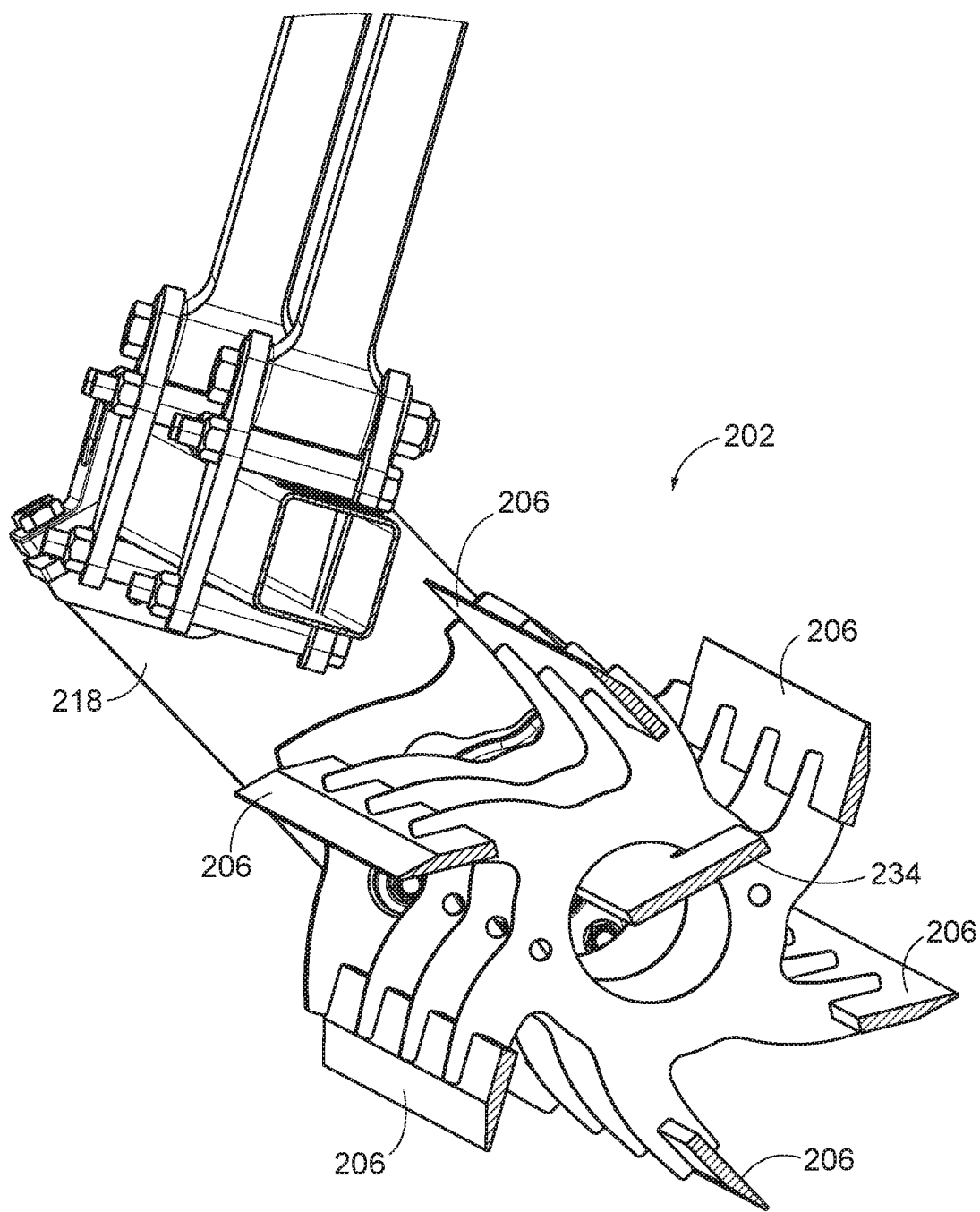
FIG. 19 is a perspective cross-sectional view of the rolling basket taken along line 15-15 of FIG. 16.

As shown in FIGS. 19 and 20, the illustrated internal scraper 234 includes an elongated blade 234a that is coupled to the posts 230, 232 and a flange 234b that extends to one side of the posts 230, 232. The flange includes a plurality of notches 238a, 238b and 238c to accommodate support plates 240, 242 and 244 inside the inner chamber 214 of the rolling basket 202. The elongated blade 234a of the internal scraper 234 is fixed to the posts 230, 232 of the support arms 220, 222 such that the rolling basket 202 rotates about the internal scraper 234. The internal scraper 234 inhibits large clods of debris (such as dirt and mud) from accumulating within the inner chamber 214 of the rolling basket 202. Specifically, as the rolling basket 202 rotates about the internal scraper 234, the internal scraper 234 breaks up and/or expels debris from within the inner chamber 214 of the rolling basket 202. In some embodiments, the flange 234b is oriented at an obtuse angle with respect to the elongated blade 234a.

As shown in FIG. 16, the illustrated support arm 220 is coupled to a frame member 260 with a top bracket 262 that engage the support arm 220. The support arm 222 is also coupled to the frame member with a top bracket 264. The angle of the frame member 160 with respect to the tractor can be changed to adjust a pressure exerted on the ground by the rolling basket 102.

The primary difference between the embodiment of FIGS. 1-9 and the embodiment of FIGS. 16-20 is the shape of the support plates 140, 142, 144 and 240, 242, 244, respectively. Other shapes and configurations of support plates can be utilized with the internal scraper 134 and 234 of the present disclosure.

Thus, the disclosure provides, among other things, an internal scraper positioned within a rolling basket.

What is claimed is:

1. An implement configured to be coupled to a vehicle for movement along a ground surface in a direction of travel, the implement comprising:
    an implement frame configured to be coupled to the vehicle for movement along the ground in the direction of travel;
    a ground-engaging tool assembly coupled to the implement frame, the ground-engaging tool assembly configured to engage the ground surface as the implement moves in the direction of travel;
    a basket coupled to the implement frame and configured to rotate with respect to the implement frame about a basket axis, the basket including a first end plate, a second end plate and a plurality of blades extending therebetween, the plurality of blades configured to engage the ground surface as the basket rotates, the plurality of blades each including a first end and a second end, each first end being positioned to engage the ground surface and each second end being positioned closer to the basket axis than the respective first end, the basket defining an internal volume between the first end plate, the second end plate and each second end of the plurality of blades, the internal volume being separated into portions by a first plane extending along the basket axis perpendicular to the ground and a second plane extending along the basket axis parallel to the ground; and
    an internal scraper positioned within the internal volume of the basket, the internal scraper having a first portion and a second portion, the first portion being proximate the basket axis and the second portion being spaced from the basket axis, the second portion of the internal scraper extending rearward of the first plane in the direction of travel and vertically away from the ground surface above the second plane, the second portion of the internal scraper being oriented at an acute angle with respect to the second plane, the internal scraper being configured to inhibit soil accumulation within the internal volume of the basket during basket rotation.

2. The implement of claim 1, further comprising a rocker bar positioned above the basket and configured to support the basket for movement along the ground surface.

3. The implement of claim 1, further comprising a first support arm and a second support arm coupling the basket to the rocker bar for rotation along the ground surface.

4. The implement of claim 3, further comprising a first peg coupled to the first support arm and coupled to a first end of the basket, and a second peg coupled to the second support arm and coupled to a second end of the basket, the basket configured to rotate about the first and second pegs.

5. The implement of claim 4, wherein the internal scraper includes a first end and a second end, the first end of the internal scraper being coupled to the first peg and the second end of the internal scraper being coupled to the second peg.

6. The implement of claim 5, wherein the first portion is coupled to the first and the second peg and the second portion is cantilevered from the first peg and the second peg.

7. The implement of claim 1, wherein the internal scraper extends substantially an entire length of the basket.

8. The implement of claim 1, wherein a majority of the internal scraper is planar and is positioned behind the first plane with respect to the direction of travel and vertically above the second plane.

9. An implement configured to be coupled to a vehicle for movement along a ground surface in a direction of travel, the implement comprising:
    an implement frame configured to be coupled to the vehicle for movement along the ground in the direction of travel;
    a ground-engaging tool assembly coupled to the implement frame, the ground-engaging tool assembly configured to engage the ground surface as the implement frame moves in the direction of travel;
    a basket coupled to the implement frame for rotation with respect to the implement frame about a basket axis, the basket including a first end plate, a second end plate and a plurality of blades extending therebetween, the plurality of blades configured to engage the ground surface as the basket rotates, the plurality of blades each including a first end and a second end, each first end being positioned to engage the ground surface and each second end being positioned closer to the basket axis than the respective first end, the basket defining an internal volume between the first end plate, the second end plate and each second end of the plurality of blades, the internal volume being separated into portions by a first plane extending along the basket axis perpendicular to the ground surface and a second plane extending along the basket axis parallel to the ground surface; and
    an internal scraper positioned within the internal volume of the basket, a portion of the internal scraper extending forward of the first plane in the direction of travel and vertically toward the ground surface below the second plane, the portion of the internal scraper being oriented at an acute angle with respect to the second plane, the internal scraper being configured to inhibit soil accumulation within the internal volume of the basket during rotation of the basket.

10. The implement of claim 9, further comprising a first support arm and a second support arm coupling the basket to a rocker bar for rotation along the ground surface.

11. The implement of claim 9, wherein the rocker bar is positioned above the basket and configured to couple the basket to the vehicle for movement along the ground surface.

12. The implement of claim 11, further comprising a first protrusion coupled to the first support arm and coupled to a first end of the basket, and a second protrusion coupled to the second support arm and coupled to a second end of the basket, the basket configured to rotate about the first and second protrusions.

13. The implement of claim 12, wherein the internal scraper includes a first end and a second end, the first end of the internal scraper being coupled to the first protrusion and the second end of the internal scraper being coupled to the second protrusion.

14. The implement of claim 13, wherein the internal scraper includes a first portion that is coupled to the first protrusion and the second protrusion and a second portion that is cantilevered from the first protrusion and the second protrusion.

15. The implement of claim 9, wherein the internal scraper extends substantially an entire length of the basket and a majority of the internal scraper is planar and is positioned forward of the first plane in the direction of travel and vertically below the second plane.

16. An implement configured to be coupled to a vehicle for movement along a ground surface in a direction of travel, the implement comprising:
an implement frame configured to be coupled to the vehicle for movement along the ground in the direction of travel;
a ground-engaging tool assembly coupled to the implement frame, the ground-engaging tool assembly configured to engage the ground surface as the implement frame moves in the direction of travel;
a basket coupled to the implement frame for rotation with respect to the implement frame about a basket axis, the basket including a first end plate, a second end plate and a plurality of blades extending therebetween, the plurality of blades being configured to engage the ground surface as the basket rotates, the plurality of blades each including a first end and a second end, each first end being positioned to engage the ground surface and each second end being positioned closer to the basket axis than the respective first end, the basket defining an internal volume between the first end plate, the second end plate and each second end of the plurality of blades, the internal volume being separated into portions by a first plane extending along the basket axis perpendicular to the ground surface and a second plane extending the basket axis parallel to the ground surface; and
an internal scraper positioned within the internal volume of the basket, the internal scraper extending at a first acute angle with respect to the first plane and a second acute angle with respect to the second plane, a first portion of the internal scraper being positioned forward of the first plane in the direction of travel and a second portion of the internal scraper being positioned rearward of the first plane in the direction of travel, the first portion of the internal scraper being positioned at a first height with respect to the ground surface, the second portion of the internal scraper being positioned at a second height with respect to the ground surface, the second height being greater than the first height, the internal scraper being configured to inhibit soil accumulation within the internal volume of the basket.

17. The implement of claim 16, wherein a majority of the internal scraper extends forward of the first plane in the direction of travel and vertically below the second plane.

18. The implement of claim 17, wherein a majority of a length of the internal scraper is positioned below the basket axis.

19. The implement of claim 18, wherein a majority of the internal scraper extends rearward of the first plane in the direction of travel and vertically above the second plane.

20. The implement of claim 19, wherein a majority of a length of the internal scraper is positioned above the basket axis.

* * * * *